United States Patent [19]

Levine et al.

[11] 4,361,273

[45] Nov. 30, 1982

[54] ELECTRONIC HUMIDITY CONTROL

[76] Inventors: Michael R. Levine, 2900 Heatherway, Ann Arbor, Mich. 48104; Allen M. Krass, 1318 E. Indian Mound, Birmingham, Mich. 48010

[21] Appl. No.: 238,171

[22] Filed: Feb. 25, 1981

[51] Int. Cl.[3] .......................... F24D 5/10; F23N 3/00
[52] U.S. Cl. ................................... 236/11; 126/113; 165/21; 236/44 R
[58] Field of Search ............... 236/44 R, 44 A, 41 C, 236/11; 126/113; 165/21

[56] References Cited

U.S. PATENT DOCUMENTS

| | | | |
|---|---|---|---|
| 2,286,551 | 6/1942 | Kingsland | 236/44 C |
| 3,464,401 | 9/1969 | McGrath | 236/44 R |
| 3,580,501 | 5/1971 | Streed | 236/91 C |
| 3,840,176 | 10/1974 | Baysinger | 236/44 R |

Primary Examiner—William E. Wayner
Attorney, Agent, or Firm—Krass, Young & Schivley

[57] ABSTRACT

A control system for a humidifier, associated with a hot air furnace, that attains a high level of relative humidity without causing any condensation on the building interior by varying the level of operation of the humidifier as a function of the rate of heat loss from the building. Since the duty cycle of the furnace is a function of the rate of the heat loss, the system generates a digital signal related to the duty cycle and uses that signal to interrogate a digital memory storing a program of desired humidities for various duty cycles to output an instantaneous desired humidity signal which is compared with a measured humidity signal to develop an on/off control signal for the humidifier.

19 Claims, 4 Drawing Figures

ELECTRONIC HUMIDITY CONTROL

TECHNICAL FIELD

This invention relates to a control system for a humidifier and more particularly to a digital electronic system operative to regulate the level of humidity in a volume heated by an associated furnace to prevent condensation in cold weather.

BACKGROUND ART

The operation of hot air furnaces to heat buildings tends to deplete the moisture content of the conditioned volume by expending warm, moist air in the combustion process and replacing it with dry air from the exterior. Moisture is also removed from the heated air by virtue of condensation on cold window and wall surfaces. Low moisture content of the heated air produces physical discomfort to the occupants of the heated building and also increases the air temperature required to produce a feeling of comfort since body moisture evaporates more readily to low humidity air and produces a body cooling effect. By way of example, it has been estimated that the degree of comfort provided a room temperature of 70° F. with 50% relative humidity requires a room temperature of 76° F. when the relative humidity is lowered to 10%. Extremely low relative humidity also has a deleterious effect on wood furniture within the heated building and the wooden components of the structure itself because of the resulting wood shrinkage and expansion during subsequent periods of higher relative humidity.

For these reasons humidifiers are often used with forced air heating systems to raise the relative humidity to a level that provides physical comfort and higher heating efficiency. The systems may simply depend upon the vaporization of water from a reservoir as the heated air passes over its surface or may be powered by motors or the like operated in timed relation to the furnace to provide a desired level of relative humidity. The powered devices may be provided with a humidistat to measure the relative humidity in the heated air and control the operation of the humidifier to attain a desired level of humidity.

The maximum desirable relative humidity will vary as a function of the temperature differential between the exterior surfaces of the building and the interior surfaces. For any given temperature differential in a given building structure, moisture will condense on the interior sides of exterior walls and windows if the interior relative humidity exceeds a predetermined level. For an interior temperature of 65° F. in a particular structure, a relative humidity of 50% may be attained without condensation for an outside "effective temperature" of 30°, but a relative humidity in excess of 20% may produce undesirble condensation when the outside "effective temperature" lowers to 10° F. "Effective temperature" is a function of the exterior temperature and wind velocity and is akin to what is commonly known as "windchill factor". The rate of heat exchange between the interior and exterior of a building structure is a function of the difference between interior temperature and this exterior "effective temperature".

In general, relative humidity may be maintained at a range limited only by comfort and heating efficiency, i.e., 40–50%, as long as the difference between the interior temperature and the effective exterior temperature is below about 35° F. As the difference increases beyond that limit the maximum relative humidity within the structure which may be attained without appreciable condensation decreases.

In order to achieve the necessary regulation of interior humidity as a function of the differential between the interior temperature and exterior effective temperature, the humidistats for active humidifiers have been provided with either manual controls which allow the adjustment of relative humidity, or automatic controls employing an exterior temperature sensor, as in U.S. Pat. No. 3,840,176. The manual control systems require constant adjustment by the operator as the temperature varies. For example, the control may be set at 50% when the exterior temperature is above 30° F., but during a sharp temperature drop, i.e., to 15° F., it must be lowered to 20% or so. Typically, the operator will simply set the manual controls to a sufficiently low relative humidity level so that no condensation will be attained even in the coldest weather. When the exterior temperature rises the control will typically be left at this low setting until someone complains about the discomfort of the low humidity. In general, these controls have proven unsatisfactory because their proper operation requires frequent operator attention. The automatic controls employing an exterior temperature sensor are relatively expensive and difficult to install and have not attained an appreciable degree of commercial acceptance.

An alternative form of open loop control of a humidifier, which does not employ any measurement of the actual humidity in the air but rather operates the humidifier as a function of the period of operation of the furnace in order to increase the amount of moisture added to the air during colder weather, as disclosed in U.S. Pat. No. 3,464,401. However, the quantity of moisture that must be added to the air as a function of the exterior temperature in order to attain the desired relative humidity for that exterior temperature is not a straight line function and not amenable to open loop control, limiting the utility of such a system.

INDUSTRIAL APPLICABILITY

The present invention is accordingly directed to an automatic control system for a humidifier, operative to modify the percentage relative humidity attained within a building structure as a function of the difference between the interior and the effective exterior temperature or the rate of heat loss from the building, which is low in cost, and simple and reliable in operation.

BEST MODE

A preferred embodiment of the invention, which will subsequently be disclosed in detail, achieves these objects through measurement of the duty cycle of the associated furnace, i.e., the ratio of furnace on time to off time, which is an effective measure of the rate of heat loss from the building or, the differential between the interior temperature and the effective exterior temperature. The duty cycle signal is used to generate a digital signal representative of the desired relative humidity for the instant duty cycle either by interrogation of a digital memory storing a program of desired relative humidities for various duty cycles or by computation using a stored algorithm. The control includes a sensor to measure that actual relative humidity in the conditioned air and a comparator operative to receive the actual relative humidity signal and the desired relative humidity signal and to develop an on/off control signal for the humidifier.

The relationship between the duty cycle of a furnace and the effective exterior temperature will vary depending upon the geographic location of the building, the nature of the building structure, and the size of the furnace. For example, a furnace in a building in a cold climate will usually be designed to attain a given duty cycle at a lower exterior temperature than a similar furnace in a warmer climate.

Accordingly, the generation of the desired humidity signal must take the nature of the installation into account and the digital memory used in one embodiment of the invention stores a number of duty cycle/relative humidity programs suitable for use in a range of installations. A manually actuable multiple position switch allows the generation of a digital code that forms part of the address to the memory, along with the duty cycle signal and effectively selects one of the programs for operative use. In the embodiment of the invention wherein the desired humidity is calculated from the duty cycle the setting of the multi-position switch controls a constant in the algorithm.

The programs and the algorithm simply generate the desired relative humidity as a function of duty cycle. The quantity of moisture that must be added to the conditioned air to attain this desired relative humidity, which is a relatively complex variable, is adjusted by the closed loop nature of the control system.

BRIEF DESCRIPTION OF THE DRAWINGS

Other objects, advantages and applications of the present invention will be made apparent by the following detailed description of several preferred embodiments of the invention. The description makes reference to the accompanying drawings in which:

FIG. 4 is a schematic diagram of an alternative embodiment of the invention wherein the desired humidity is calculated from the furnace duty cycle.

DETAILED DESCRIPTION OF THE INVENTION

Figure 1:
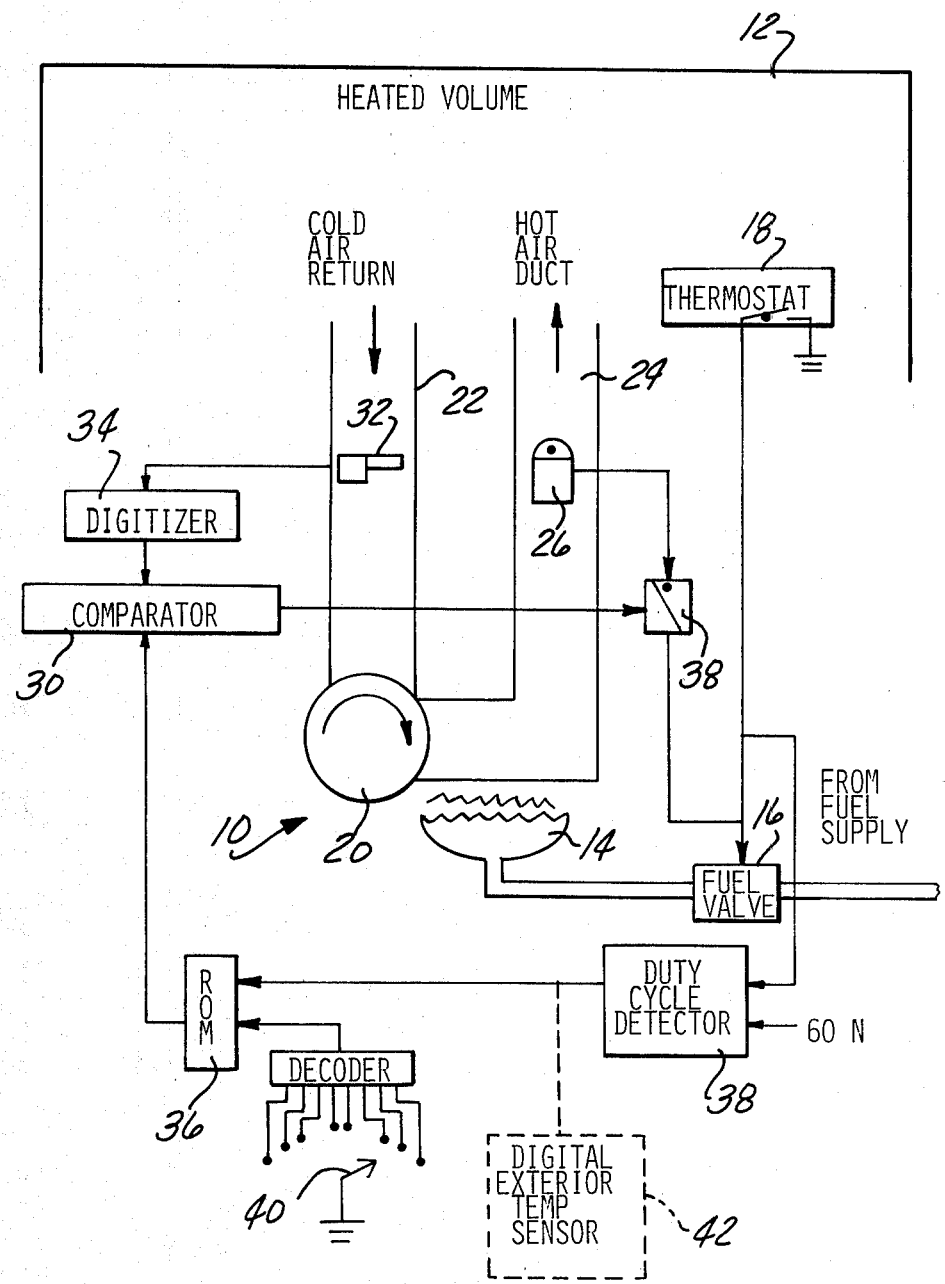
FIG. 1 is a schematic diagram illustrating an electronic humidistat, formed in accordance with the preferred embodiment of the invention, utilized in connection with a forced air heating system.

The preferred embodiment of the present invention is utilized in connection with a fuel-fired hot air furnace, generally indicated at 10, used to maintain the temperature in an enclosed volume, schematically illustrated at 12, which might be a building structure or a portion thereof. The furnace 10 is representative of the class of heat sources including heat pumps and the like. The pertinent components of the furnace illustrated in FIG. 1 include a burner 14 supplied with fuel such as gas or oil, from an appropriate fuel supply, through an electrically actuated fuel valve 16. The operation of the valve 16 is controlled by a conventional thermostatic switch 18, normally located centrally within the heated volume 12. The thermostat 18 is of the conventional type wherein a manually or electronically adjusted set-point is compared with a measurement of the actual temperature within the heated volume to control the condition of a switch connected in an electrical circuit with the fuel valve 16. The thermostat may be of the programmable electronic type disclosed in Levine U.S. Pat. No. 4,206,872 which provides a program of varying set points for times over a repetitive time cycle.

The furnace further includes a blower 20 which draws air into a cold air return duct 22, from the heated volume 12, and forces air heated by the burner 14 out into the heated volume through hot air duct 24.

The furnace 10 is equipped with a powered humidifier 26 located in the hot air duct. The humidifier may take the form of a conventional, powered evaporative humidifier, such as the type that employs a motor driven drum that rotates through a water reservoir and has its surface exposed to heated air blowing through the hot air duct. Alternatively, other forms of humidifiers such as the type employing a controllable damper to selectively direct heated air over a wetted surface, the electrolytic evaporative type, or the controlled water valve spray type, may be employed. The essential characteristic of the humidifier is that the degree of moisture that the humidifier adds to the heated air must be controllable, either on an on/off basis or on a proportional control basis. The humidifier drive motor is controlled by an electronic switch 28 connected to the fuel valve 16 to receive power when the thermostat switch 18 is closed. Thus, the humidifier is energized at such time as the furnace burner 14 is energized by the valve 16 and the switch 28 is closed. The switch 28 is in turn controlled by a signal from a comparator 30 forming part of the electronic humidistat.

The preferred embodiment of the electronic humidistat is implemented with a microcomputer and the components described hereinafter may be considered to be representative of functions performed by the computer. Alternatively, the system could be assembled from discrete components as represented by the elements of the schematic diagram.

The electronic system includes a sensor 32 operative to sense the relative humidity of the moisture contained in the heated volume 12, preferably located within the cold air return duct 22. The sensor 32 preferably employs an element that generates an analog voltage proportional to the relative humidity content of the measured air. The sensor 32 may employ a variable resistive element, a semi-conductor or an amorphous semi-conductor sensor. It may include conventional electronics for generating a voltage proportional to the sensor operation such as a bridge circuit.

This analog voltage is provided to an analog to digital converter 34, operative to provide a digital output, preferably in parallel form, to the comparator 30. The comparator compares the digital signal representative of the relative humidity of the cold air, as derived from the sensor 32, with a set point signal derived from a read-only memory (ROM) 36 operative to store a plurality of different programs of desired relative humidities for various duty cycles of the furnace 10. As has been noted the duty cycle of the furnace is a function of the temperature differential between the heated volume and the effective exterior temperature. For a given furnace in a given building structure there is a constant factor that relates duty cycle to this temperature differential and the different programs stored in the ROM 36 represent the basic program for the desired relative humidity for different exterior temperatures with different constants in each case, as will be subsequently explained.

The signal proportional to the duty cycle of the furnace is generated by a duty cycle detector 38 which receives a signal indicative of the state of the operation of the furnace from the thermostat 18. The detector 38 is also connected to the 60 cycle power line and utilizes the frequency of the power signal as a time standard in a manner which will be subsequently disclosed. The duty cycle detector provides an output signal in the form of a digital number which is a function of the percentage of the time the furnace was operative during some given past interval, such as one hour.

The ROM 36 also receives a digital signal representative of the state of a manually adjustable multi-position switch 40. The switch is adjusted to a position which effectively selects one of the several humidity/duty cycle programs stored within the ROM 36 for operative use. The position of the switch 40 is intended to be adjusted to a position which will attain the maximum humidity in the heated volume without undue condensation on the interior windows and walls in a manner which will be subsequently described. The output of the switch 40 is provided to a decoder 41 which generates the digital input to the ROM 36.

The concept of the present invention is broad enough to encompass the use of an exterior temperature sensor 42, illustrated in dotted lines in FIG. 1, as an alternative to the duty cycle detector, although use of the duty cycle detector represents an important aspect of the present invention. Since the signal outputted by the duty cycle detector 38 will be closely proportional to the exterior temperature, assuming that there is not a great deal of variation in the interior temperature, a digital signal generated by an exterior temperature sensor such as 42 could be used to interrogate the ROM 36.

Figure 2:
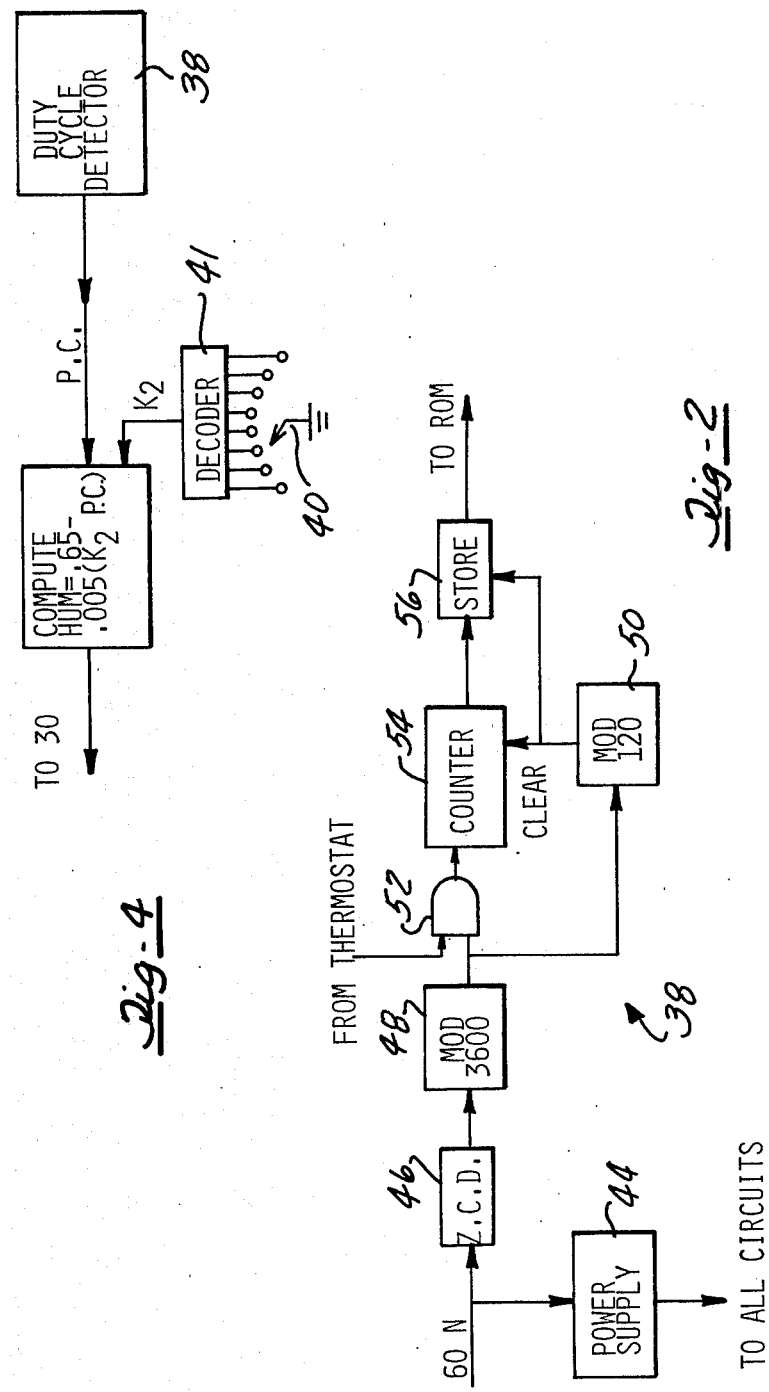
FIG. 2 is a schematic diagram of the duty cycle detector used with the system of FIG. 1.

FIG. 2 illustrates, in schematic form, a preferred form of the circuitry of the duty cycle detector 38. The alternating current power mains are connected to a power supply 44 for the duty cycle detector as well as to a zero crossing detector 46, which generates output pulses at the rate of 120 per second and provides them to a modulo 3600 counter 48. The counter 48 overflows once in each 30 second interval to generate pulses which are provided to a modulo 120 counter 50 as well as to one input of an AND gate 52. The AND gate is also conditioned by the same signal from the thermostat 18 which energizes the fuel valve 16. Accordingly, pulses from the modulo 3600 counter 48 are applied to the counter 54 as long as the furnace is energized. The modulo 120 counter 50 overflows once each hour. The resulting output signal acts to store the count contained in the counter 54 in a memory unit 56, and to clear the counter. The number contained in the counter 54 at the clear time is dependent upon the percentage of time during the past hour that the furnace has been energized. If the furnace has been energized 100% of the time during the past hour the counter 54 will contain a count of 120 at the time it is cleared. If the furnace has been on 50% of the time the count will be 60 at clearing time. This is the signal that is provided to the ROM 36 to cause output of the digital number representative of the desired relative humidity, based on the setting of the manual multi-position switch 40.

Figure 3:
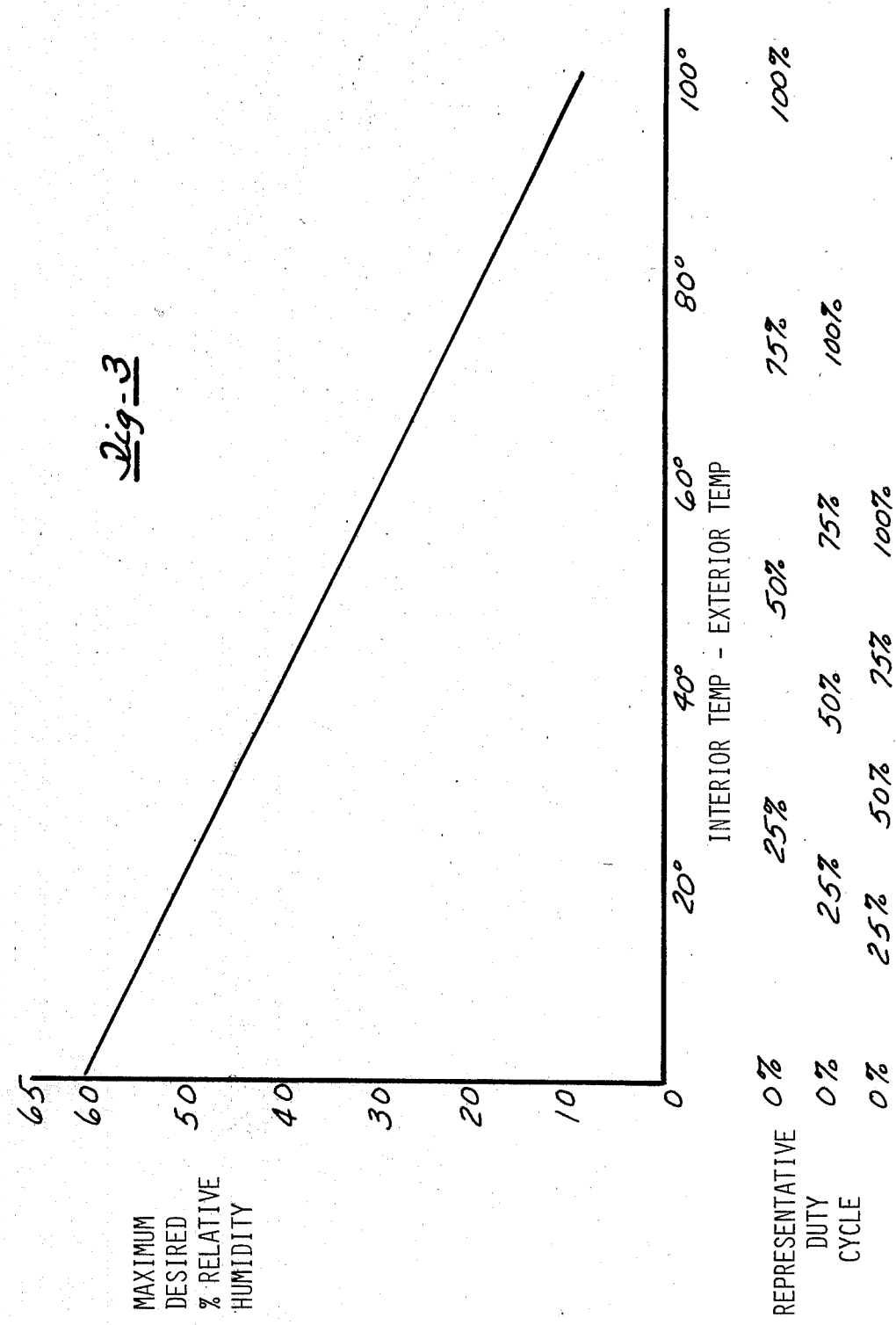
FIG. 3 is a plot relating maximum desired relative humidity versus difference between inside and outside temperature.

FIG. 3 is a plot of desired maximum relative humidity versus differential between interior and effective exterior temperatures applicable to all buildings based on the equation $$\text{humidity} = 0.6 - 0.005(\text{temp diff}).$$

As the temperature difference increases the percentage of relative humidity must decrease in order to prevent condensation. The ordinate of the curve also plots a range of duty cycles for the temperature differentials. The duty cycles will in general depend upon the size of the furnace in relation to the heated area, the degree of insulation of the building structure, and the minimum temperature which may be expected to occur in that area. For example, a furnace designed for use in a well insulated building in a climate where the temperature seldom drops below 10° F., may have a duty cycle of 50% at 20° F. At another installation in a relatively poorly insulated building wherein the exterior temperature may be expected to drop to −10° F., the furnace may have a duty cycle of 20% at 20° F. The various duty cycle scales arrayed along the ordinate of FIG. 3 represent a range of duty cycles for differing situations and the programs stored in the ROM 34 represent the relative humidity versus duty cycle programs for these different types of installations.

The signals outputted by the ROM 36 are not continuous but rather represent discrete points along their programs. For example, for a given setting of the switch 40, the ROM may provide the same relative humidity setting over a range of several percent variation in duty cycle. As a practical matter, the provision of eight different programs may be adequate and accordingly the desired humidity figures could be stored as 3-bit digital signals.

The ROM 36 will store one complete program of relative humidity/duty cycle for each setting of the switch 40. In use, the switch 40 should initially be set at a position that provides a somewhat higher relative humidity for a given duty cycle than would be expected in view of the furnace size, building insulation and climate. If, in use, condensation is noted on the interior of the building, the setting of the switch 40 may be adjusted to the next lower setting and this process continued until the condensation stops. Once that is done it should not be necessary to reset the switch 40 but rather the system will continue to modify the humidifier operation as a function of the sensor reading the duty cycle to maintain the maximum desired amount of humidity in the air without condensation.

The duty cycle/desired maximum relative humidity programs stored in the ROM 36 are generated from the equation $$\text{humidity} = 0.6 - 0.005(\text{duty cycle} \times K_1)$$

where $K_1$ is the operator adjusted constant set by the multi-position switch 40.

FIG. 4 illustrates an alternative embodiment of the invention wherein the ROM 36 is replaced by a computation module 60. The module receives the output of the duty cycle detector 38 and the decoder 41 for the multi-position switch 40 and computes a desired maximum relative humidity signal which is provided to the comparator 30. Only the computation module 60 and its two input devices are illustrated in FIG. 4 as the system is otherwise identical to the circuit of FIG. 1.

The computation module computes the desired maximum humidity signal from the above equation. Other constants could be employed in the other embodiments of the invention.

The computation could be alternatively performed on an analog basis in which case analog humidity and duty cycle sensors would preferably be employed.

What is claimed is:

1. A control system for a device for modifying the humidity of a contained air volume, the volume having its temperature controlled by an intermittently operative temperature modifying apparatus, comprising:

means for generating a first electrical signal having a value which is a function of the duty cycle of the temperature modifying apparatus;

means for receiving the first electrical signal and generating a signal representation of the desired relative humidity within the volume;

means for generating a signal representative of the actual relative humidity within the contained air volume; and comparator means operative to receive the signal representative of the desired relative humidity within the volume and the signal representative of actual relative humidity within the volume and to control the operation of the device to maintain the actual relative humidity substantially equal to the desired relative humidity.

2. The system of claim 1 wherein said means for receiving the first electrical signal and generating a signal representative of the desired relative humidity within the volume comprises means for computing the desired relative humidity within the volume from a stored algorithm in which said first electrical signal represents a variable.

3. The system of claim 1 wherein said means for receiving the first electrical signal and generating a signal representative of the desired relative humidity within the volume constitutes a memory storing a program of desired relative humidities for a range of duty cycles and means for interrogating the memory with said first electrical signal to generate a signal representative of the desired relative humidity.

4. The system of claim 3 wherein said digital memory contains a plurality of programs for desired relative humidities and a range of duty cycles, and further including adjustable means for selecting one of said programs for operative use.

5. The system of claim 1 wherein the intermittently operative temperature modifying apparatus for the contained volume comprises a fuel powered furnace.

6. The system of claim 5 wherein the fuel powered furnace includes an electrical energized fuel valve, and said means for generating an electrical signal representative of the duty cycle of the temperature modifying apparatus comprises means for measuring the duty cycle of the energizing signal for said fuel valve.

7. the system of claim 1 wherein the temperature modifying apparatus includes a blower motor, and said means for generating an electrical signal representative of the duty cycle of the temperature modifying apparatus comprises means for measuring the duty cycle of the energizing signal for said blower motor.

8. The system of claim 1 wherein said device for modifying the humidity of the contained air volume comprises an electrically energized humidifier and said system controls the state of energization of the humidifier energizing signal.

9. In a heating system for a contained volume including a heat source, an electrically energizable control for the source, and an electrically energized humidifier operative, when energized, to add moisture to furnace heated air, the improvement comprising:

means for generating an electrical signal proportional to the duty cycle of the source;

means operative to receive said duty cycle signal and to generate an electrical signal representative of the desired humidity;

a humidity sensor operative to generate a signal proportional to the actual humidity in the heated volume; and a comparator operative to receive the signal representative of desired humidity and the signal representative of actual humidity and to control the energization of the humidifier to maintain the humidity within the volume at the level of the desired humidity signal.

10. The system of claim 9 in which said means for generating a signal proportional to the duty cycle of the source includes means for sensing the state of energization of the furnace.

11. The system of claim 10 wherein said means for sensing the state of energization of the source comprises circuit means connected to the source energization circuit.

12. The system of claim 10 wherein said means for measuring the duty cycle of the source includes a real time clock, means for measuring the state of energization of the furnace, and means for generating a signal proportional to the ratio of the real time period during which the furnace is energized relative to the real time period the furnace is de-energized.

13. The system of claim 8 wherein said means for generating a signal proportional to the duty cycle of the source comprises a counter, means for entering pulses into the counter at regular intervals during times of energization of the source, and means for clearing the clock at regular intervals and for storing the number cleared from the counter.

14. The system of claim 9 wherein said means operative to receive said duty cycle signal and to generate an electrical signal representative of the desired humidity constitutes a digital memory storing a program of desired humidities for a range of duty cycles and means for interrogating the memory with the duty cycle signal.

15. The system of claim 14 wherein said memory includes a plurality of differing programs for desired humidities over a range of duty cycles for the source and manually operative means for selecting one of said programs for operative use.

16. In a humidifier system including a humidity sensor having switching contacts connected in the humidity energizing circuit, the improvement comprising means for measuring the duty cycle of an intermittently operative heater for the humidified volume, and means connected to the switching contacts for modifying their operation as a function of the duty cycle.

17. The system of claim 16 wherein said means for sensing the duty cycle of the heater for the humidified volume employs temperature sensor disposed within the humidified volume and circuitry for receiving the output of the sensor and determining the state of energization of the source.

18. The system of claim 16 wherein said means for sensing the duty cycle of the heater for the humidified volume includes means connected to the heater for sensing the operative state of the heater, a real time clock, and means for determining the ratio of on time to off time of the heater.

19. An electronic humidistat operative to be connected into a system including a thermostat controlled heat source and a humidifier in order to control the state of energization of the humidifier to maintain controlled levels of relative humidity in the heated and humidified air volume, comprising:

means for generating a digital electrical signal representative of the actual relative humidity in said volume;

means for generating a digital electrical signal representative of the duty cycle of the source;

a memory operative to store a program of desired humidities for differing duty cycles;

means for addressing the memory with the duty cycle signal to output a desired relative humidity signal; and a comparator operative to receive the desired relative humidity signal and the actual relative humidity signal to control the state of energization of the humidifier to obtain the desired relative humidity.

* * * * *